United States Patent [19]

Titcomb et al.

[11] 3,987,206

[45] Oct. 19, 1976

[54] HIGH COMPLETE PROTEIN BREAD

[75] Inventors: Stanley T. Titcomb, Portchester; Arthur A. Juers, Baldwin, both of N.Y.

[73] Assignee: International Telephone and Telegraph Corporation, Nutley, N.J.

[22] Filed: Nov. 14, 1974

[21] Appl. No.: 523,642

[52] U.S. Cl. .................................. 426/62; 426/23; 426/555
[51] Int. Cl.² ............................................ A23L 1/00
[58] Field of Search .............. 426/23, 62, 152, 185, 426/656, 653, 549, 555

[56] References Cited
UNITED STATES PATENTS

| | | | |
|---|---|---|---|
| 2,989,399 | 6/1961 | Ehle | 426/23 |
| 3,679,433 | 7/1972 | Pomeranz et al. | 426/23 X |
| 3,780,188 | 12/1973 | Tsen et al. | 426/152 |
| 3,851,066 | 11/1974 | Langhans | 426/23 X |

OTHER PUBLICATIONS

Hulse, "Protein Enrichment of Bread and Baked Products," (Discussion and Summary) in New Protein Foods (Altschul, Editor), vol. 1A, pp. 217–223, (1974).

*Primary Examiner*—Raymond N. Jones
*Attorney, Agent, or Firm*—John T. O'Halloran; Thomas M. Marshall

[57] ABSTRACT

The bread composition includes six different proteins and an amino acid. Some of the proteins are complete and others incomplete. The individual proteins are blended according to the method in a proper combination to produce a bread product having a high complete protein composition.

3 Claims, No Drawings

HIGH COMPLETE PROTEIN BREAD

BACKGROUND OF THE INVENTION

This invention relates to a high protein bread and more particularly, to a high complete protein-enriched, soft white bread.

Bread is known to be one of the universally accepted foods used throughout the world. Bread is the principal food and provides more nutrients than any other single food source. It has been determined that in 53% of the countries, bread supplies over one-half of the total caloric intake, and in 87% of the countries, over 30%. In most western European countries, it is the source of one-half the carbohydrates, one-third of the proteins, over 50% of the B Vitamins, and over 75% of Vitamin E.

In the United States, enriched, soft white bread is the principal bread consumed and accounts for approximately 70% of the U.S. bread market. Since bread is so common to our diet, it has been fortified with Iron, Vitamin B1, B2 and Niacin. Protein improvement by use of milk and soy proteins has also been a common practice in the bakery industry for many years. However, fortification to achieve bread with significant quantities of "complete protein", i.e. protein efficiency ratio of 2.5, has not been achieved due to the technical problems associated with such a product. Flavor, texture, appearance, processing methods and tolerances and a balanced amino acid profile all were problems that had to be overcome.

SUMMARY OF THE INVENTION

An object of the invention is to provide a high complete protein bread product.

Another object of the invention is to produce a high complete protein-enriched, soft white bread while maintaining the acceptable eating quality and texture.

According to the broader aspects of the invention, the bread composition and method of making same comprises blending of complete and incomplete proteins in a proper combination and process to produce the new bread product containing a high and complete protein balance.

DESCRIPTION OF THE PREFERRED EMBODIMENTS

Protein, an essential nutrient, is a major component of milk, eggs, meat, beans and cereals. These food proteins are dissimilar with each composed of simpler substances called amino acids. Proteins differ in the amounts and proportions of amino acids they contain. Proteins that incorporate all the essential amino acids in the amount needed by man are called "complete proteins" while those lacking or containing an insufficient amount of one or more of the essential amino acids are called "incomplete proteins". The U.S. recommended daily allowance for complete protein is 45 grams and 65 grams for incomplete proteins. Up to now, no bread has met the biological criterion for a complete protein. According to the invention, however, this has been achieved by critically selecting protein sources with the nutritional and functional properties required and processing the compositions to achieve the proper results.

Six different proteins and the amino acid lysine were selected and adjusted to provide the protein source. Some of these proteins are "complete" and others "incomplete" (Table I) and are as follows:

TABLE I

| Source of Protein | Preferred Percent of Total Protein | Type |
|---|---|---|
| Wheat | 46.6 | Incomplete |
| Whey (milk protein) | 18.3 | Complete |
| Soy | 17.7 | Incomplete |
| Casein (milk protein) | 11.6 | Complete |
| Egg | 3.1 | Complete |
| Yeast | 1.5 | Incomplete |
| Lysine (Amino Acid) | 1.2 | — |
| | 100.0 | |

The blending of these individual proteins in the proper combination has resulted in a new food product containing "complete protein balance". Because the new bread composition contains complete protein, a 2 oz. serving will provide 20% of the U.S. Recommended Daily Allowance (U.S.R.D.A.) compared to enriched bread which provides only 8% U.S. R.D.A. Obviously one needs far less, i.e. 2½ times less, of this new bread to satisfy his protein requirements than one would need if all his protein came from any other known bread. Economic consideration cannot be overlooked either, and it has been calculated that the cost at present prices to satisfy 20% of the U.S.R.D.A. for the protein bread is 8.13 cents and is 11.31 cents for the standard enriched bread. It has also been calculated that this new bread has a lower per gram cost for protein than any other good source of high quality protein such as milk, fish and steak.

In order to fully appreciate the invention, the following typical standard formulation for white enriched bread according to the prior art is tabulated. The concentrations of ingredients are indicated in parts by weight based on 100 parts flour and identified according to standards in the industry.

| STANDARD WHITE ENRICHED BREAD | |
|---|---|
| INGREDIENTS SPONGE | Parts By Weight Based On 100 Parts Flour |
| Wheat Flour, Patent | 65.00 |
| Yeast | 2.50 |
| Yeast Food | 0.50 |
| Hydrated Mono and Diglycerides | 0.75 |
| Lard | 3.00 |
| Water | 37.00 |
| Enrichment "M" | Two tablets |
| DOUGH | |
| Flour | 35.00 |
| Salt | 2.25 |
| Corn Sugar (dry) | 10.00 |
| Soy Flour and Whey Powder | 2.00 |
| Calcium Sulfate | 0.40 |
| Calcium Propionate | 0.10 |
| Water | 24.00 |

PROCEDURE

The procedure for the standard bread is to mix the sponge ingredients in a standare mixer for approximately four minutes and allow the sponge to ferment for approximately 4 hours at about 76° F. The sponge is then combined with the dough ingredients and mixed for approximately ten minutes. The mixed dough is then allowed to relax for an additional 30 minutes before dividing and weighing, and 10 minutes before shaping into individual loaves which are placed in bread pans and allowed to proof for approximately 1 hour. The proofed loaves are baked for approximately 21 minutes at 415° F., cooled and sliced.

The foregoing ingredient composition and procedure is established for large commercial bakeries. The sponge and dough ingredients are handled in a manner which facilitates large volume production of bread for shipping and delivering to retail outlets with a minimum of holding time from production of the sponge to purchase by the consumer.

The preferred combination is listed in the following example. Example I provides the formulation and method for producing the high complete protein bread with a protein efficiency ratio of 2.5 or greater. The ingredients are indicated in parts by weight based on 100 parts total flour in accordance with industry procedures.

EXAMPLE I

HIGH COMPLETE PROTEIN WHITE ENRICHED BREAD

| INGREDIENTS | PARTS BY WEIGHT BASED ON 100 PARTS TOTAL FLOUR | |
|---|---|---|
| SPONGE | Preferred | Range |
| Wheat Flour, Patent | 65.00 | |
| Wheat Gluten | 2.00 | 1.0–3.0 |
| Yeast | 3.50 | |
| Yeast Food | 0.625 | |
| Hydrated Mono and Diglycerides | 0.75 | |
| L-Lysine Hydrochloride | 0.35 | 0–0.5 |
| Casein | 3.75 | 2.00–6.00 |
| Soy Protein Isolate (1) | 5.75 | 1.0–7.0 |
| Water | 52.00 | |
| Enrichment "M" (2) | 2 Tablets | |
| DOUGH | | |
| Wheat Flour, Patent | 30.00 | |
| Whole Wheat Fine | 5.00 | |
| Yeast | 0.75 | |
| Granulated Sugar | 8.00 | |
| Egg White Solids | 1.125 | 0–2.25 |
| Lard | 3.00 | |
| Calcium Propionate | 0.125 | |
| Salt | 2.25 | |
| Sodium Stearoyl-2 Lactylate (3) | 0.50 | |
| High Protein Whey Powder (4) | 9.875 | 8.5–21.0 |
| Water | 32.00 | |

(1) EDIPRO N - produced by Ralston-Purina, St. Louis, Mo.
(2) A vitamin and mineral enrichment produced and identified as No. 335 by Paniplus, Kansas City, Mo.
(3) Dough conditioning additive produced by C.J. Paterson Co., Kansas City, Mo.
(4) Enrpro-50 produced by Stauffer Chemical Co., Edina, Minnesota.

PROCEDURE

For the preferred ingredients:
a. combine sponge ingredients and mix for three minutes at low speed and one minute at high speed on a A120-Hobart Mixer. Set sponge at 78° F. and ferment for 4 hours.
b. make a slurry before mixing dough of the water, sugar, yeast, and whey powder.
c. add sponge, slurry and dry ingredients to mixer. Mix dough two minutes at low speed and about 2½ minutes at high speed on A120-Hobart Mixer. Dough temperature after mixing 80° F. and dough fermentation time 30 minutes. Scale 19 ounce pieces and allow to rest 10 minutes. Shape and place in pan 10¼ × 4¾ × 3¼ inches. Proof to ¾ inch above pan. Bake 18 minutes at 390° F. Cool and slice.

RESULTS

The resulting loaves were analyzed and evaluated. The high complete protein bread was similar in all respects to the standard white enriched bread including quality, specific volume, color, grain and texture, crumb and taste. The results indicated that the formulation did not detract from the standard white bread loaf qualities.

EXAMPLE II

The procedure of Example I was repeated for the indicated ranges of protein while keeping the 100% total as required in Table I using adjustments in the protein ingredients according to standard techniques.

The resultant loaves were evaluated and it was determined that they met the requirements for quality with a protein efficiency ratio of 2.5 or greater.

In order to substantiate the evaluations, a test group was set up which included about 400 heads of household who served the standard white enriched bread, and about 400 heads of household who were variety (i.e., ryes, whole wheat, etc.) bread oriented. The group received a high complete protein loaf and a loaf of standard formulation enriched white bread for use in their homes. The breads were not brand-identified but each loaf was marked with a label identifying it either as "protein bread" or "enriched white bread". The bread was left for testers to use in their homes for a period of 4 days. They were then called back for a thorough discussion of their attitudes and opinions about the bread. The results of this test indicated that 70% of enriched white bread users preferred the protein bread. Taste was mentioned most frequently as a reason for preference. The explanation lies in part with the richness of flavor imparted by the protein ingredients used in the formulation. This is significant since an excellent nutritional rating is worthless unless people eat and enjoy the product.

Also of special interest is that this protein bread has a total fat content or less than 4% so that the protein-to-fat ratio makes it an ideal food for many special diets and provides an important alternate source of high quality protein for those who wish to modify their diets to reduce their fat and cholesterol intake. Two ounces of this bread would contain less than 2 mg. of cholesterol. Consumption of high protein foods in a beef eating country such as the U.S. frequently brings with it the excessive intake associated with high amounts of fat and cholesterol. This high complete protein bread has been formulated to be a viable alternate protein virtually free of these associated detriments. Older people and particularly those living alone often do not eat properly, so that this bread formulation which is also enriched with B Vitamins and Iron can provide both convenience and contribute to their good nutrition.

Not to be overlooked is the problem that protein is costly. This bread provides good protein at lower cost than most other foods. This formulation of high complete protein bread is an exciting, nutritional development with broad taste appeal and satisfaction for all the family which may well meet the potential protein crisis in the years ahead.

While we have described above the principles of our invention in connection with specific examples and method steps, it is to be clearly understood that the description and examples are made only to enable practicing of the invention and not as a limitation to the scope of the invention as set forth in the objects thereof and in the accompanying claims.

We claim:
1. A composition for preparing a high complete protein white bread product comprising in parts by weight based on 100 parts total wheat flour:
   100 parts wheat flour;

1 to 3 parts by weight wheat gluten;
about 0.35 to 0.5 parts by weight L-Lysine hydrochloride;
2 to 6 parts by weight casein;
1 to 7 parts by weight soy protein isolate;
about 1.125 to 2.25 parts by weight egg white solids; and
8.5 to 21 parts by weight high protein whey powder.

2. A composition for preparing a high complete protein white bread product comprising in combination based on 100 parts by weight flour:
100 parts wheat flour;
about 2 parts by weight of wheat gluten;
about 3.75 parts by weight of casein;
about 5.75 parts by weight of soy protein isolate;
about 1.125 parts by weight of egg white solids;
about 9.875 parts by weight of high protein whey powder;
about 0.35 parts by weight L-Lysine hydrochloride; and
about 4.25 parts by weight of yeast, and 0.625 parts by weight of yeast food.

3. A formulation for producing a high complete protein white bread having a protein efficiency ratio of 2.5 or greater and a total fat content of less than 4 percent, wherein the percent of total protein consists of a mixture of:
46.6 percent wheat protein;
18.3 percent whey protein;
17.7 percent soy protein;
11.6 percent casein;
3.1 percent egg white solids;
1.5 percent yeast protein; and
1.2 percent L-Lysine hydrochloride.

* * * * *